W. P. MILLER.
Saw-Teeth.
No. 142,258.  Patented August 26, 1873.
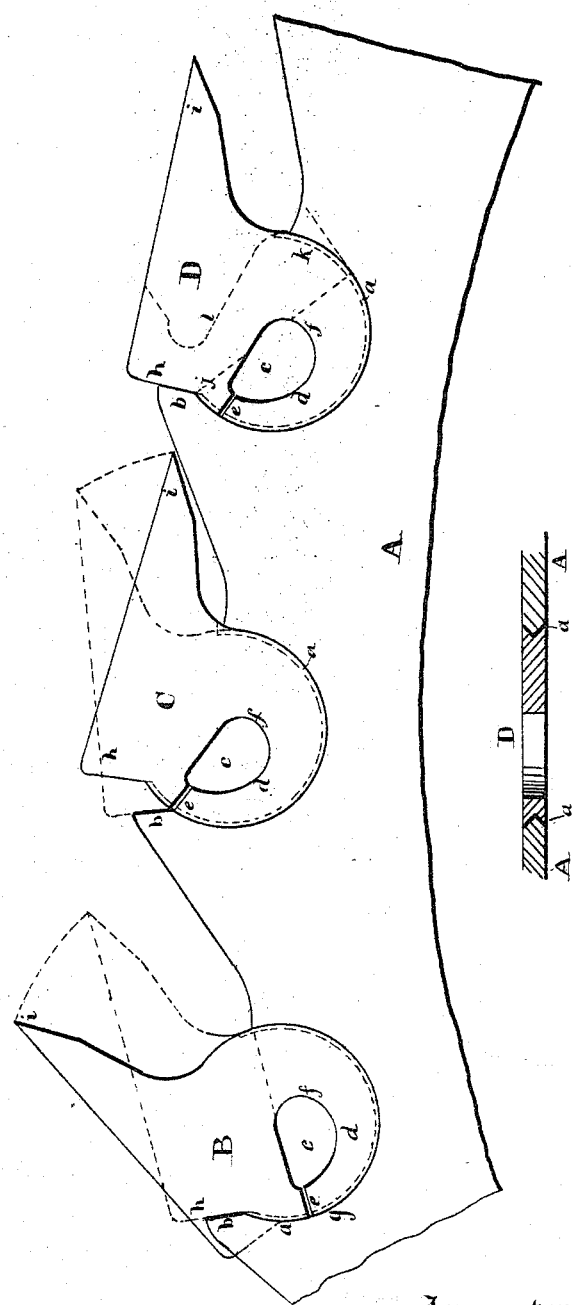
Witnesses.  Inventor.
Jacob Brenner  Warren P Miller
D. C. Gander Jr.

UNITED STATES PATENT OFFICE.

WARREN P. MILLER, OF NEW YORK, N. Y.

IMPROVEMENT IN SAW-TEETH.

Specification forming part of Letters Patent No. 142,258, dated August 26, 1873; application filed July 29, 1873.

*To all whom it may concern:*

Be it known that I, WARREN P. MILLER, of the city, county, and State of New York, have invented a new and useful Improvement in Saw-Teeth for Circular Saws; and I do hereby declare that the following is a full, clear, and exact description of the construction and operation of the same, reference being had to the annexed drawing making a part of this specification.

Said drawing represents a segment of a saw with three teeth, each in a different position, as required, to insert a tooth into its socket.

A represents the saw-plate. B is a tooth set in the first position ready to be inserted; C, a tooth, turned to the second position. D shows a tooth turned to its last position and permanently fixed.

The nature and object of my invention are to provide an efficient and reliable mechanical arrangement for attaching removable teeth to circular disks for saws.

To enable others skilled in the art to make and use my invention, I will proceed to describe its construction and operation.

I form circular sockets all around the periphery of the disk A, with a V-shaped edge, as shown at $a$, and ending with a square shoulder at $b$, the same as shown in patent granted to me on the 1st day of September, A. D. 1868, and numbered 81,811. The teeth are formed as shown, and a groove cut in all the circular part to receive the V formed on the inner edge of each socket. The circular part or shank of each tooth is pierced, in the manner shown at $c$, in order that the bottom $d$ may be made elastic after being separated from the body of the tooth, as at $e$. This separation is effected by feeding the tooth up to a fine revolving mill. After the teeth are tempered they are laid on an anvil and struck at $f$ with a hammer, so as to expand them, until they are about one-sixteenth of an inch larger than the socket, as shown by the dotted line at $g$.

It will be understood that by inserting a small lever into the cavity at $c$, the tang or bottom of the tooth may be sprung to one side, so that the heel $h$ will rest at the side of the plate $b$, thus allowing the bottom of the shank to enter into position in the socket, after which the point of the tooth $i$ is turned down, as shown in C, which allows the heel to spring into line. The tooth is next turned back, by means of any suitable wrench, so that it assumes the positions shown at D, which completes the operation.

The shank of the tooth being elastic insures a perfect fit in each socket though they should vary a fraction in size.

Some of the advantages of this mode of construction are, first, the tooth, across from $j$ to $k$, is solid and cannot be compressed and thus drawn out of the socket; second, the spring of the tooth $d$ may be comparatively light, there being no more strain on it when the tooth is working than when at rest; third, should the point of a tooth while working, from some cause, be turned down, as shown at C, it cannot be thrown from the socket.

I claim—

An insertible tooth for saws, when the shank is cut and separated at the back, as at $e$, for the purpose of springing the same laterally that it may be inserted into a circular socket comprising more than half of a circle, substantially as shown.

WARREN P. MILLER.

Witnesses:
 JACOB BRENNER,
 F. C. CANDER, Jr.